United States Patent
Lelowicz et al.

(10) Patent No.: US 12,211,233 B2
(45) Date of Patent: Jan. 28, 2025

(54) METHODS AND SYSTEMS FOR TRAINING A MACHINE LEARNING METHOD FOR DETERMINING PRE-DETERMINED POINTS IN AN IMAGE

(71) Applicant: Aptiv Technologies AG, Schaffhausen (CH)

(72) Inventors: Kamil Lelowicz, Bogunice (PL); Mariusz Nowak, Katowice (PL)

(73) Assignee: Aptiv Technologies AG, Schaffhausen (CH)

( * ) Notice: Subject to any disclaimer, the term of this patent is extended or adjusted under 35 U.S.C. 154(b) by 277 days.

(21) Appl. No.: 17/659,301

(22) Filed: Apr. 14, 2022

(65) Prior Publication Data

US 2022/0335650 A1    Oct. 20, 2022

(30) Foreign Application Priority Data

Apr. 15, 2021  (EP) .................................. 21168669

(51) Int. Cl.
| | |
|---|---|
| G06T 7/73 | (2017.01) |
| G06T 3/4046 | (2024.01) |
| G06T 3/60 | (2024.01) |

(52) U.S. Cl.
CPC .............. *G06T 7/75* (2017.01); *G06T 3/4046* (2013.01); *G06T 3/60* (2013.01); *G06T 2207/20081* (2013.01); *G06T 2207/20084* (2013.01)

(58) Field of Classification Search
CPC .... G06T 7/70; G06T 7/80; G06T 7/75; G06T 7/73; G06T 2207/20081; G06N 3/08
See application file for complete search history.

(56) References Cited

U.S. PATENT DOCUMENTS

| | | | | |
|---|---|---|---|---|
| 2022/0270377 | A1* | 8/2022 | Shen | G06V 10/443 |
| 2022/0335651 | A1 | 10/2022 | Lelowicz et al. | |
| 2023/0132646 | A1* | 5/2023 | Ratti | G06V 20/52 |
| | | | | 348/159 |

FOREIGN PATENT DOCUMENTS

| | | | | | |
|---|---|---|---|---|---|
| CA | 2994511 | C | * | 1/2020 | .......... G06K 9/0063 |
| CN | 109118473 | A | * | 1/2019 | .......... G06T 7/0002 |

(Continued)

OTHER PUBLICATIONS

S. N. Raza, H. Raza ur Rehman, S. G. Lee and G. Sang Choi, "Artificial Intelligence based Camera Calibration," 2019 15th International Wireless Communications & Mobile Computing Conference (IWCMC), Tangier, Morocco, 2019, pp. 1564-1569, doi: 10.1109/IWCMC.2019.8766666. (Year: 2019).*

(Continued)

*Primary Examiner* — Michael Robert Cammarata
(74) *Attorney, Agent, or Firm* — Harness, Dickey & Pierce, P.L.C.

(57) ABSTRACT

Disclosed are computer systems and computer-implemented methods for training a machine-learning method for determining pre-determined points in an image. The method includes training a first machine-learning method based on training data indicating whether or not a pre-determined point is present in a cell of the image; training a second machine-learning method based on a position of pre-determined points in the cell and based on training of the first machine-learning method; and training a third machine-learning method based on a modified version of the image and based on training of the second machine-learning method. Also disclosed are methods and computer systems implementing the trained machine-learning method.

15 Claims, 6 Drawing Sheets

(56) References Cited

FOREIGN PATENT DOCUMENTS

| CN | 111105466 | | 5/2020 | |
| --- | --- | --- | --- | --- |
| CN | 111242088 A | * | 6/2020 | ......... G06K 9/00671 |
| CN | 111640157 | | 9/2020 | |
| CN | 111640157 A | * | 9/2020 | ............. G06T 5/009 |

OTHER PUBLICATIONS

Arca, S.; Casiraghi, E.; Lombardi, G. Corner localization in chessboards for camera calibration. In Proceedings of the International Conference on Multimedia, Image Processing and Computer Vision (IADAT-MICV2005), Madrid, Spain, Mar. 30,-Apr. 1, 2005. (Year: 2005).*

"Extended European Search Report", EP Application No. 21168669.6, Oct. 7, 2021, 12 pages.

"Extended European Search Report", EP Application No. 21168656.3, Oct. 12, 2021, 15 pages.

Donne, et al., "MATE: Machine Learning for Adaptive Calibration Template Detection", Nov. 2016, 16 pages.

Fernandez, et al., "Fast and Robust Multiple ColorChecker Detection using Deep Convolutional Neural Networks", Oct. 2018, 10 pages.

Raza, et al., "Artificial Intelligence Based Camera Calibration", Jun. 24, 2019, pp. 1564-1569.

Yang, et al., "Precise Measurement of Position and Attitude Based on Convolutional Neural Network and Visual Correspondence Relationship", Jun. 2020, 12 pages.

"Pursuant to MPEP § 2001.6(b) the applicant brings the following co-pending application to the Examiner's attention: U.S. Appl. No. 17/659,054".

* cited by examiner

METHODS AND SYSTEMS FOR TRAINING A MACHINE LEARNING METHOD FOR DETERMINING PRE-DETERMINED POINTS IN AN IMAGE

CROSS-REFERENCE TO RELATED APPLICATION

This application claims priority to European Patent Application Number 21168669.6, filed Apr. 15, 2021, the disclosure of which is hereby incorporated by reference in its entirety.

BACKGROUND

Digital imaging devices, such as digital cameras, are used in automotive applications for a variety of tasks. However, it may be required to properly calibrate the digital imaging device.

Accordingly, there is a need to provide efficient and reliable methods for camera calibration.

SUMMARY

Disclosed are methods and systems for training a machine-learning method for determining pre-determined points in an image. The present disclosure provides a computer-implemented method, a computer system and a non-transitory computer readable medium according to the additional example section and the independent claims. Embodiments are given in the subclaims, the description and the drawings.

In one aspect, the present disclosure is directed at a computer-implemented method for training a (third) machine-learning method for determining pre-determined points in an image, the method comprising the following steps performed (in other words: carried out) by computer hardware components: training a first machine-learning method based on training data indicating whether or not a pre-determined point is present in a cell of the image; training a second machine-learning method based on a position of pre-determined points in the cell and based on training of the first machine-learning method; and training a third machine-learning method based on a modified version of the image and based on training of the second machine-learning method.

In other words, overall training of a machine-learning method may be split into three phases, wherein in each phase an individual machine-learning method is trained, based on the training of the machine-learning method of the previous phase (it will be understood that in the first phase no previous phase is available, and as such, the training in the first phase does not involve any previously trained neural network). The complexity of the training may increase from phase-to-phase.

For example, one or more of the first machine-learning method, second machine-learning method, and third machine-learning method may be the machine-learning method as described herein.

According to an embodiment, the modified version comprises the image after image processing. The modified version of the image may also be referred to as an adversarial-like image. The adversarial-like image may be created to intentionally confuse the method, and to provoke wrong results.

According to an embodiment, the image processing comprises at least one of a rotation, a scaling, a flipping, and an embedding in another image (for example in a random image).

According to an embodiment, the image comprises (or shows) a checkerboard.

According to an embodiment, the pre-determined points comprise saddle points of the checkerboard.

According to an embodiment, saddle points are crossings of black-white borders of the checkerboard.

According to an embodiment, the machine-learning method comprises an artificial neural network.

In another aspect, the present disclosure is directed at a computer-implemented method for determining pre-determined points in an image, the method comprising the following steps carried out by computer hardware components: providing the image to a sequence of processing layers; and determining the pre-determined points in the image based on the output of the last processing layer of the sequence of processing layers; wherein the last processing layer comprises a respective output data set for each of a plurality of cells of the image; wherein each output data set comprises a plurality of probabilities and a plurality of positions, each probability indicating a probability of a pre-determined number of pre-determined points in the respective cell, and each position indicating a position in the respective cell.

In other words, a machine-learning method may be provided which outputs respective probabilities for how many pre-determined points are present, and estimations of the position(s) of the pre-determined point(s).

The respective position may be a position of a potential pre-determined point.

The plurality of layers may include or may be fifteen (15) layers (which may form an artificial neural network or a part of an artificial neural network).

According to an embodiment, the output is of a YOLO (You Only Look Once) type.

The output of a YOLO type may be a grid. Each cell in the grid may include information about detection. Each cell may include one or more detections. According to various embodiments, a single detection may be described by three parameters: (1) probability of existence of a saddle point in a particular cell, (2) saddle point position in the x axis, and (3) saddle point position in the y axis within the cell (range from 0 to 1, wherein (0,0) may mean top left cell corner and (1,1) may mean bottom right cell corner).

In other words, YOLO-like output may include dividing the image into regions which are described by an output grid.

According to an embodiment, the last processing layer comprises a softmax layer.

According to an embodiment, the plurality of probabilities comprises an integer number of probabilities, wherein the pre-determined numbers of pre-determined points in the respective cell comprises integer numbers between zero and one less than the integer number of probabilities.

According to an embodiment, the image comprises (or shows) a checkerboard.

According to an embodiment, the pre-determined points comprise saddle points of the checkerboard.

According to an embodiment, saddle points are crossings of black-white borders of the checkerboard.

In another aspect, the present disclosure is directed at a computer system, said computer system comprising a plurality of computer hardware components configured to carry out several or all steps of the computer-implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer-implemented method in the computer system. The non-transitory data storage and/or the memory unit may comprise a computer program for instructing the computer to perform several or all steps or aspects of one or more of the computer-implemented methods described herein, for example using the processing unit and the at least one memory unit.

According to an embodiment, the computer system further comprises a camera configured to acquire the image.

In another aspect, the present disclosure is directed at a non-transitory computer readable medium comprising instructions for carrying out several or all steps or aspects of one or more of the computer-implemented methods described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of one or more of the computer-implemented methods described herein.

With the methods and devices as described herein, a technique of using machine-learning to identify saddle points in camera calibration patterns may be provided.

BRIEF DESCRIPTION OF THE DRAWINGS

Aspects of embodiments and functions of the present disclosure are described herein in conjunction with the following drawings, showing schematically.

DETAILED DESCRIPTION

The present disclosure relates to methods and systems for training a machine-learning method for determining pre-determined points in an image. According to various embodiments, a machine-learning based saddle points detector may be provided.

Saddle point on an image (or picture) may be one of the most characteristic features that can be extracted from the image. Saddle points may be widely used for intrinsic calibration of a camera, extrinsic calibration of a camera, and/or matching characteristic points.

An accuracy of finding saddle points may have critical impact to quality of camera calibration. Moreover, each camera mounted in a car may need to be calibrated. The main goal of a method may be to find all saddle points in a picture with subpixel accuracy under all light conditions.

According to various embodiments, the input may be an image with one grayscale channel. The maximum resolution may be smaller or equal to 1920×1080; otherwise, the input image may be divided in smaller part. Each pixel may be coded as a float 32.

Figure 1A:
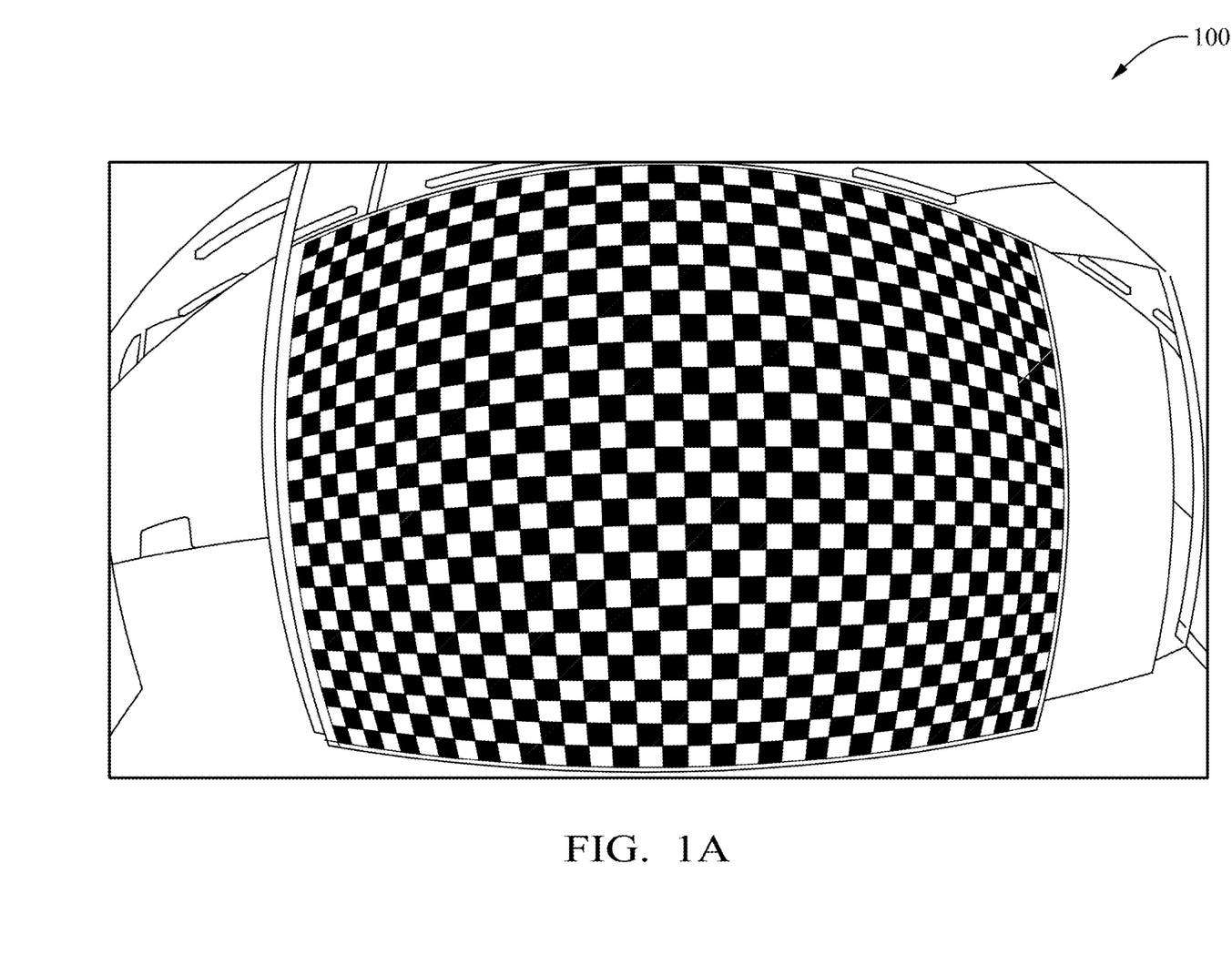
FIG. 1A is an illustration of an example of input data.

FIG. 1A shows an illustration 100 of an example of input data, i.e. an input image. It can be seen how big distortion appears in the picture. The image shows a checkerboard.

Figure 1B:
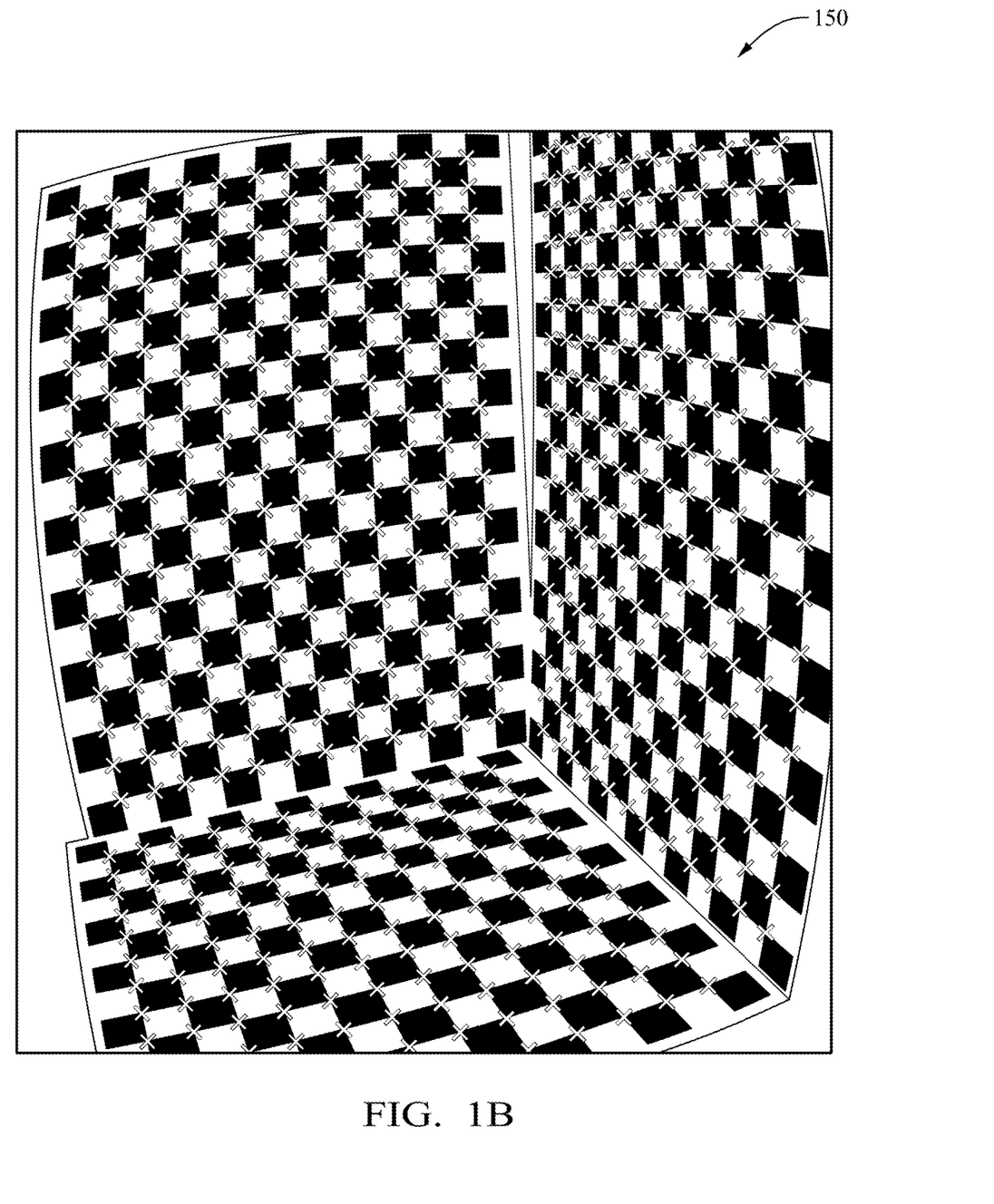
FIG. 1B is an illustration of a further example of input data.

FIG. 1B shows an illustration 150 of a further example of input data. It can be seen that checkerboards may be provided in more than one plane.

Figure 2:
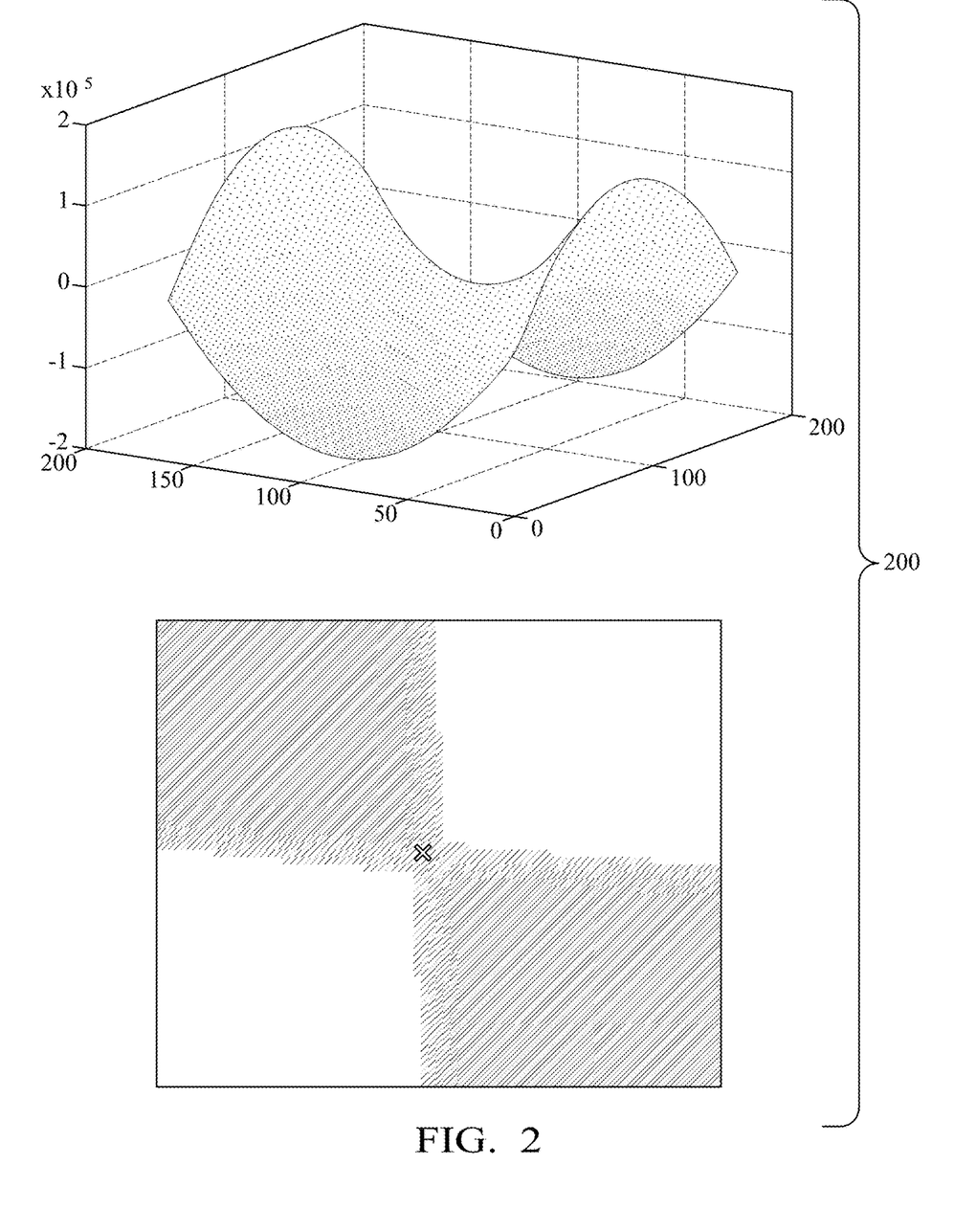
FIG. 2 is an illustration of saddle point examples.

FIG. 2 shows an illustration 200 of saddle point examples. In the top portion of FIG. 2, the pixel values are shown over the pixel coordinates. The bottom portion shows the image, and the saddle point is at the crossing between the borders between dark areas and light areas.

According to various embodiments, a machine-learning based saddle point detector may be provided and may improve robustness of algorithm under all light conditions and may reduce execution time.

According to various embodiments, the (artificial) neural network may be provided.

According to various embodiments, a training method of an (artificial) neural network may be provided, and a training stage may utilize adversarial-like samples, as will be described in more detail below.

According to various embodiments, the core of the neural network may be based on a residual neural network (ResNet). For example, the network may include (or may be made up) of fifteen (15) layers and may contain about 1 million parameters. The input to the neural network may be a grayscale picture with shape (or dimensions) (1080, 1920); in other words, the input image may be grayscale image which is 1920 pixels wide and 1080 pixels high. The output from the neural network may be YOLO (You Only Look Once) type. The grid may have size 135 px by 240 px (sixty-four (64) times smaller than the input). Each cell may consist of seven (7) numbers, which describe corresponding 8 px by 8 px on original image. First three (3) numbers may describe probability of no saddle point in cell, one saddle point in cell or two (2) saddle points in a cell. These values are calculated using a softmax layer. The next four (4) numbers may describe position of saddle points (x, y) for first and second detection. The position may be measured from upper left corner of the cell. The x and y may be in the range from 0 to 1, they are outputted using hard-sigmoid function.

Figure 3:
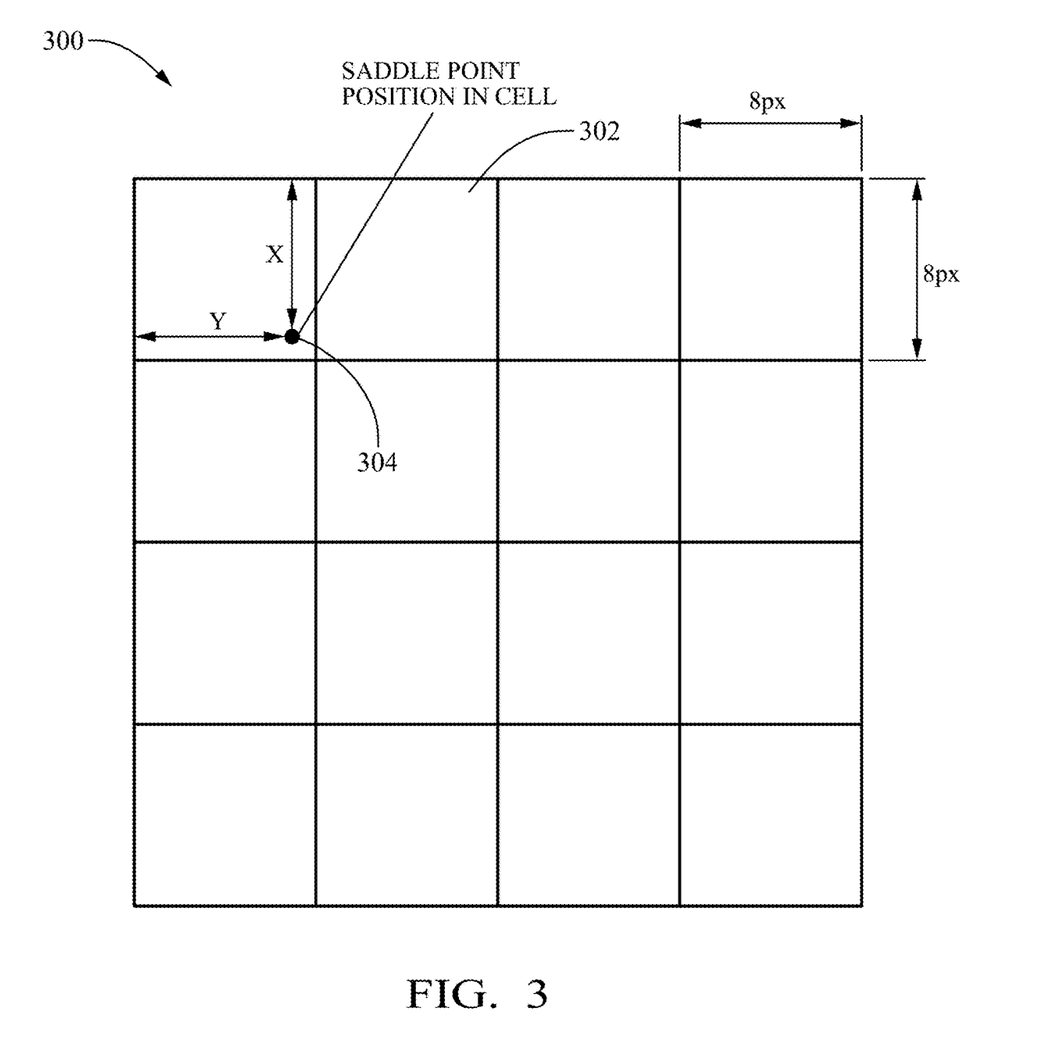
FIG. 3 is an illustration of an output structure according to various embodiments.

FIG. 3 shows an illustration 300 of an output structure according to various embodiments. The input image may be divided into a plurality of cells, one of which is denoted exemplarily by reference sign 302. Each cell may be 8 pixels wide and 8 pixels high. An example of a saddle point 304 is illustrated.

According to various embodiments, the training of the neural network may include three phases. In a first phase, only the confidence whether the saddle point/points exist in a cell or not may be taken into account. In a second phase, the saddle point position may be included during training. In a third (in other words: last) stage, in order to minimize the number of false positive cases, adversarial-like training may be used. The random parts of checkerboards may be rotated, scaled, flipped and then embedded in random pictures.

All three phases may be performed on the same neural network (i.e. each phase may modify the preliminary weights obtained from the previous phase).

In the first phase, the core of the neural network (NN) may be trained to only correctly predict the existence of saddle point in the cells. When the network performs well in predicting the existence of saddle points, the resulting weights may be used as a starting point for the second phase.

In the second stage, the NN may also be trained to predict the position of each detected saddle point.

The third phase may be the adversarial training phase, where the network may be fed with input that consists of parts of the checkerboard and real-life images stitched together.

Figure 4:
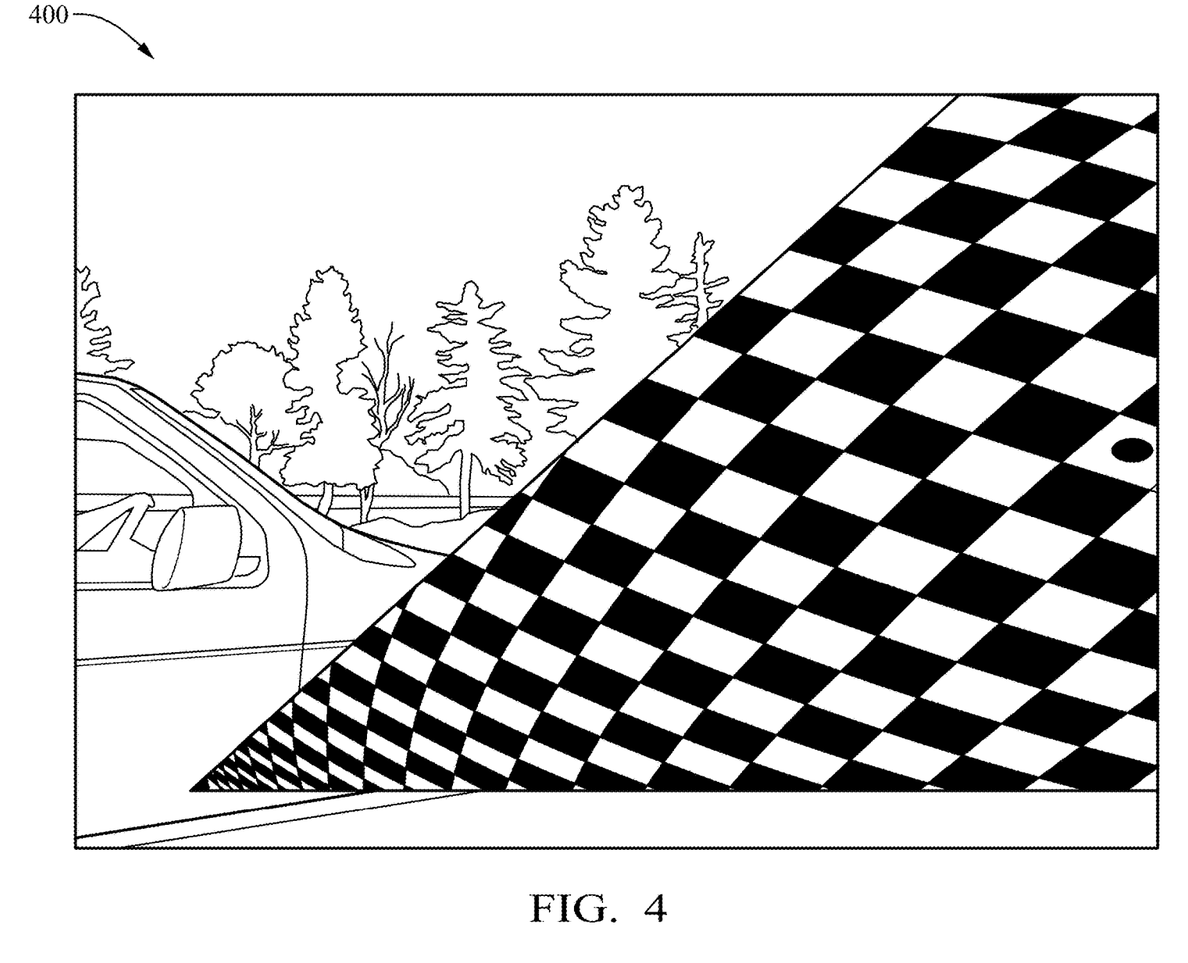
FIG. 4 is an illustration of an adversarial like data example.

FIG. 4 shows an illustration 400 of an adversarial like data example.

In good light conditions and when the checkerboard is placed in the center of the image (and hence the distortion is small) and is perpendicular to the camera, the method according to various embodiments may find all or almost all the saddle points. Even if for example the floor, especially with a carpet, may be noisy, no false positive detections may be observed. Thus, under favorable conditions, the method according to various embodiments works very well.

Even situations where the checkerboard is no longer perpendicular to camera may not affect the performance of the method according to various embodiments.

Even when the checkerboard is off-center (from the camera central axis), as there are distorted corners, the method according to various embodiments may still perform very good and all or almost all the points may be detected.

Even when the lighting conditions are harder, and very bright background (for example behind a window) and dark interior lead to smaller contrast on checkerboard, so that the checkerboard lighting is not uniform, the method according to various embodiments may still perform very well.

The method according to various embodiments may be fast and may give good numerical results.

The method according to various embodiments may be very accurate in corners where distortion is very high and contrast very low.

The method according to various embodiments may be very robust.

Figure 5:
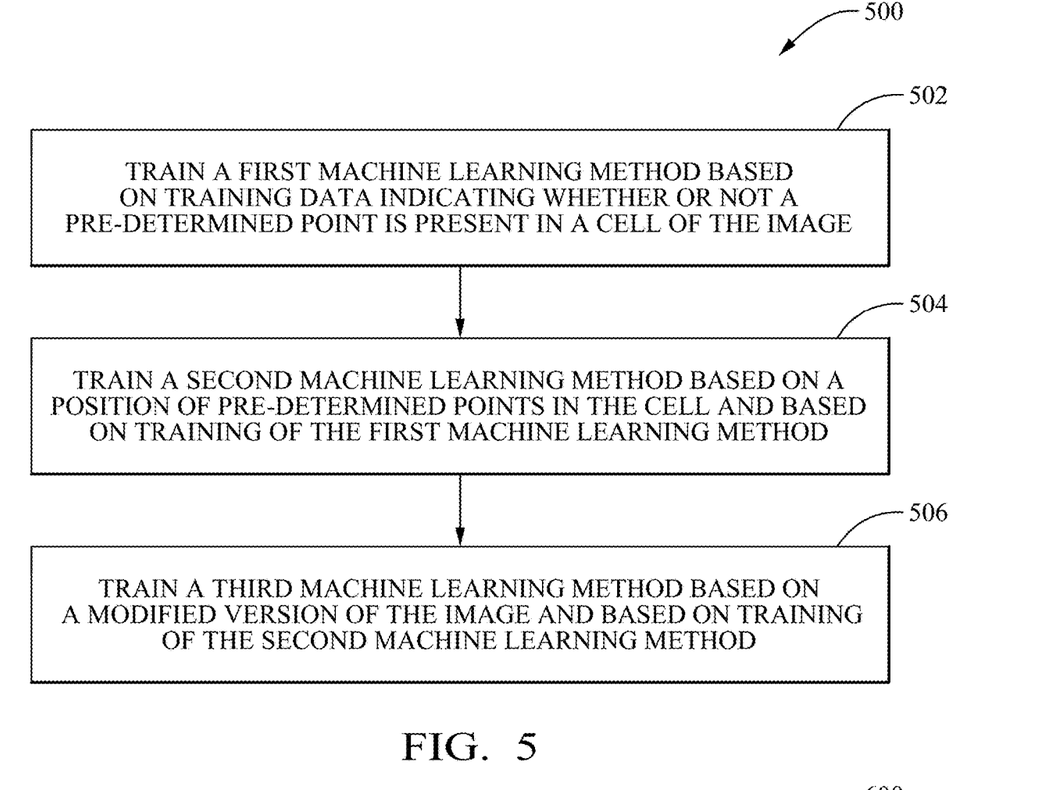
FIG. 5 shows a flow diagram illustrating a method for training a machine-learning method for determining pre-determined points in an image according to various embodiments.

FIG. 5 shows a flow diagram 500 illustrating a method for training a machine-learning method for determining pre-determined points in an image according to various embodiments. At 502, a first machine-learning method may be trained based on training data indicating whether or not a pre-determined point is present in a cell of the image. At 504, a second machine-learning method may be trained based on a position of pre-determined points in the cell and based on training of the first machine-learning method. At 506, a third machine-learning method may be trained based on a modified version of the image and based on training of the second machine-learning method.

According to various embodiments, the modified version may include or may be the input image after image processing.

According to various embodiments, the image processing may include or may be at least one of a rotation, a scaling, a flipping, and an embedding in another image.

According to various embodiments, the image may include or may show a checkerboard.

According to various embodiments, the pre-determined points may include or may be saddle points of the checkerboard.

According to various embodiments, saddle points may be crossings of black-white borders of the checkerboard.

According to various embodiments, the machine-learning method may include or may be an artificial neural network.

Figure 6:
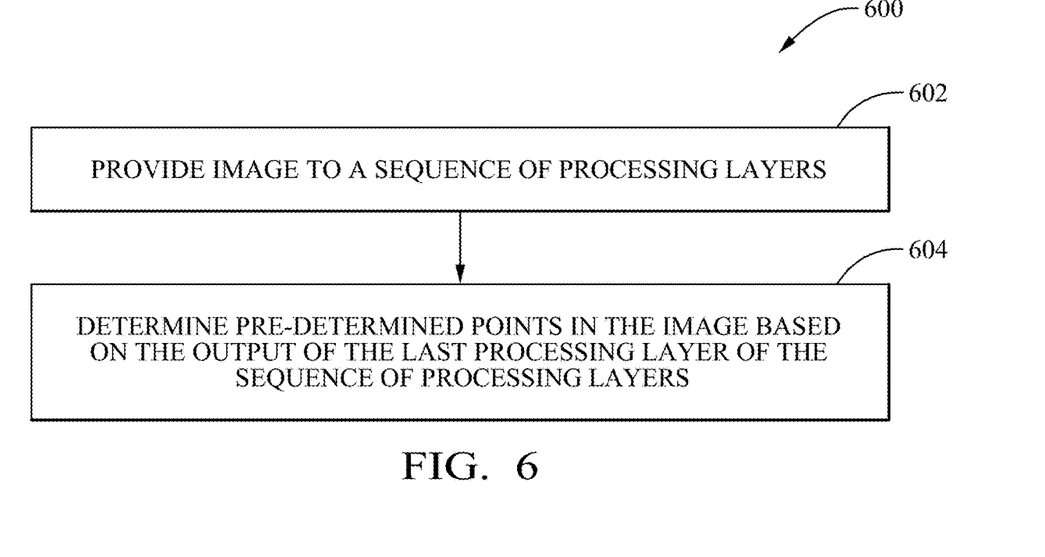
FIG. 6 shows a flow diagram illustrating a method for determining pre-determined points in an image according to various embodiments.

FIG. 6 shows a flow diagram 600 illustrating a method for determining pre-determined points in an image according to various embodiments. At 602, the image may be provided to a sequence of processing layers. At 604, the pre-determined points in the image may be determined based on the output of the last processing layer of the sequence of processing layers. The last processing layer may include or may be a respective output data set for each of a plurality of cells of the image. Each output data set may include or may be a plurality of probabilities and a plurality of positions, each probability indicating a probability of a pre-determined number of pre-determined points in the respective cell, and each position indicating a position in the respective cell.

According to various embodiments, the output may be of a YOLO type.

According to various embodiments, the last processing layer may include or may be a softmax layer.

According to various embodiments, the plurality of probabilities may include or may be an integer number of probabilities, wherein the pre-determined numbers of pre-determined points in the respective cell comprises integer numbers between zero and one less than the integer number of probabilities.

According to various embodiments, the image may include or may show a checkerboard.

Each of the steps 502, 504, 506, 602, 604 and the further steps described above may be performed by computer hardware components.

Additional Examples

Some additional examples of methods and systems for training a machine-learning method for determining pre-determined points in an image are as follows:

Example 1. A computer-implemented method for training a machine-learning method for determining pre-determined points in an image, wherein the image is divided into a plurality of cells, wherein the image comprises a checkerboard, and wherein the pre-determined points comprise saddle points of the checkerboard, the method comprising the following steps carried out by computer hardware components: training the machine-learning method in a first phase based on training data indicating whether or not a pre-determined point is present in a cell of the image; training the machine-learning method in a second phase based on a position of pre-determined points in the cell and based on training of the machine-learning method in the first phase; and training the machine-learning method in a third phase based on a modified version of the image and based on training of the machine-learning method in the second phase, wherein the modified version comprises the image after image processing.

Example 2. The computer-implemented method of example 1, wherein the image processing comprises at least one of a rotation, a scaling, a flipping, and an embedding in another image.

Example 3. The computer-implemented method of example 1, wherein saddle points are crossings of black-white borders of the checkerboard.

Example 4. The computer-implemented method of example 1, wherein the machine-learning method comprises an artificial neural network.

Example 5. A computer-implemented method for determining pre-determined points in an image using a machine-learning method trained according to a computer-implemented method for training a machine-learning method for determining pre-determined points in an image, wherein the image is divided into a plurality of cells, wherein the image comprises a checkerboard, and wherein the pre-determined points comprise saddle points of the checkerboard, the method for training comprising the following steps carried out by computer hardware components: training the machine-learning method in a first phase based on training data indicating whether or not a pre-determined point is present in a cell of the image; training the machine-learning method in a second phase based on a position of pre-determined points in the cell and based on training of the machine-learning method in the first phase; and training the machine-learning method in a third phase based on a modified version of the image and based on training of the machine-learning method in the second phase, wherein the modified version comprises the image after image processing.

Example 6. The computer-implemented method of example 5, the method comprising the following steps carried out by computer hardware components: providing the image to a sequence of processing layers; and determining the pre-determined points in the image based on the output of the last processing layer of the sequence of processing layers; wherein the last processing layer comprises a respective output data set for each of a plurality of cells of the image; wherein each output data set comprises a plurality of probabilities for how many pre-determined points are present and a plurality of estimations of the positions of the pre-determined points, each probability indicating a probability of a pre-determined number of pre-determined points in the respective cell, and each position indicating a position in the respective cell.

Example 7. The computer-implemented method of example 6, wherein the output is of a YOLO type.

Example 8. The computer-implemented method of example 6, wherein the last processing layer comprises a softmax layer.

Example 9. The computer-implemented method of example 6, wherein the plurality of probabilities comprises an integer number of probabilities, wherein the pre-determined numbers of pre-determined points in the respective cell comprises integer numbers between zero and one less than the integer number of probabilities.

Example 10. A computer system, the computer system comprising a plurality of computer hardware components configured to carry out steps of a computer-implemented method for training a machine-learning method for determining pre-determined points in an image, wherein the image is divided into a plurality of cells, wherein the image comprises a checkerboard, and wherein the pre-determined points comprise saddle points of the checkerboard, the method comprising the following steps carried out by computer hardware components: training the machine-learning method in a first phase based on training data indicating whether or not a pre-determined point is present in a cell of the image; training the machine-learning method in a second phase based on a position of pre-determined points in the cell and based on training of the machine-learning method in the first phase; and training the machine-learning method in a third phase based on a modified version of the image and based on training of the machine-learning method in the second phase, wherein the modified version comprises the image after image processing.

Example 11. The computer system of example 10, further comprising a camera configured to acquire the image.

Example 12. Non-transitory computer readable medium comprising instructions for carrying out a computer-implemented method for training a machine-learning method for determining pre-determined points in an image, wherein the image is divided into a plurality of cells, wherein the image comprises a checkerboard, and wherein the pre-determined points comprise saddle points of the checkerboard, the method comprising the following steps carried out by computer hardware components: training (502) the machine-learning method in a first phase based on training data indicating whether or not a pre-determined point is present in a cell of the image; training (504) the machine-learning method in a second phase based on a position of pre-determined points in the cell and based on training of the machine-learning method in the first phase; and training (506) the machine-learning method in a third phase based on a modified version of the image and based on training of the machine-learning method in the second phase, wherein the modified version comprises the image after image processing.

Example 13. A computer system, the computer system comprising a plurality of computer hardware components configured to carry out steps of a computer-implemented method for determining pre-determined points in an image using a machine-learning method trained according to a computer-implemented method for training a machine-learning method for determining pre-determined points in an image, wherein the image is divided into a plurality of cells, wherein the image comprises a checkerboard, and wherein the pre-determined points comprise saddle points of the checkerboard, the method for training comprising the following steps carried out by computer hardware components: training the machine-learning method in a first phase based on training data indicating whether or not a pre-determined point is present in a cell of the image; training the machine-learning method in a second phase based on a position of pre-determined points in the cell and based on training of the machine-learning method in the first phase; and training the machine-learning method in a third phase based on a modified version of the image and based on training of the machine-learning method in the second phase, wherein the modified version comprises the image after image processing.

Example 14. The computer system of example 13, further comprising a camera configured to acquire the image.

Example 15. A non-transitory computer readable medium comprising instructions for carrying out a computer-implemented method for determining pre-determined points in an image using a machine-learning method trained according to a computer-implemented method for training a machine-learning method for determining pre-determined points in an image, wherein the image is divided into a plurality of cells, wherein the image comprises a checkerboard, and wherein the pre-determined points comprise saddle points of the checkerboard, the method for training comprising the following steps carried out by computer hardware components: training the machine-learning method in a first phase based on training data indicating whether or not a pre-determined point is present in a cell of the image; training the machine-learning method in a second phase based on a position of pre-determined points in the cell and based on training of the machine-learning method in the first phase; and training the machine-learning method in a third phase based on a modified version of the image and based on training of the machine-learning method in the second phase, wherein the modified version comprises the image after image processing.

What is claimed is:

1. A computer-implemented method for training a machine-learning method for determining pre-determined points in an image, wherein the image is divided into a plurality of cells, wherein the image comprises a checkerboard, and wherein the pre-determined points comprise saddle points of the checkerboard, the method comprising:
   training the machine-learning method in a first phase based on training data indicating whether or not a pre-determined point is present in one of the plurality of cells of the image;
   training the machine-learning method in a second phase based on a positions of the pre-determined points in the one of the plurality of cells of the image and based on the training of the machine-learning method in the first phase; and
   training the machine-learning method in a third phase based on a modified version of the image that comprises the image after image processing and based on the training of the machine-learning method in the second phase.

2. The computer-implemented method of claim 1, wherein the saddle points comprise crossings of black-white borders of the checkerboard.

3. The computer-implemented method of claim 1, wherein the image processing comprises at least one of:
   a rotation of the image;
   a scaling of the image;
   a flipping of the image; or
   inclusion of the image in another image.

4. The computer-implemented method of claim 1, wherein the machine-learning method further comprises an artificial neural network.

5. A The computer-implemented method of claim 1, further comprising:
   providing the image to a sequence of processing layers; and
   determining of the pre-determined points in the image based on an output of a last processing layer in the sequence of processing layers,
   wherein
      the last processing layer comprises a respective output data set for each of the plurality of cells of the image,
      each output data set comprises a plurality of probabilities for how many pre-determined points are present and a plurality of estimations of the positions of the pre-determined points,
      each probability indicates a probability of a pre-determined number of pre-determined points in the respective cell, and
      each of the positions is a position in the respective cell.

6. The computer-implemented method of claim 1, further comprising:
   during the second phase, modifying first weights received from the first phase; and
   during the third phase, modifying second weights received from the second phase.

7. The computer-implemented method of claim 1, wherein, during the first phase, only confidence whether one or more of the saddle points exist in the one of the plurality of cells or not is taken into account.

8. The computer-implemented method of claim 1, further comprising:
   during the second phase, a corresponding neural network is trained to predict a position of each of the saddle points in the one of the plurality of cells; and
   during the third phase, feeding the neural network with parts of the checkerboard and real-life images stitched together.

9. The computer-implemented method of claim 1, further comprising:
   providing the image to a sequence of processing layers; and
   determining the pre-determined points in the image based on an output of a last processing layer in the sequence of processing layers,
   wherein
      the last processing layer comprises a respective output data set for each of the plurality of cells of the image, and
      each output data set comprises a plurality of probabilities for how many pre-determined points are present and a plurality of estimations of the positions of the pre-determined points.

10. A computer system comprising a plurality of computer hardware components configured to:
    train a machine-learning method in a first phase based on training data indicating whether or not a pre-determined point is present in one of a plurality of cells of an image, wherein the image comprises a checkerboard;
    train the machine-learning method in a second phase based on a positions of pre-determined points in the one of the plurality of cells of the image and based on the training of the machine-learning method in the first phase, wherein the pre-determined points comprise saddle points of the checkerboard; and
    train the machine-learning method in a third phase based on a modified version of the image that comprises the image after image processing and based on the training of the machine-learning method in the second phase.

11. The computer system of claim 10, wherein the computer system further comprises a camera configured to acquire the image.

12. The computer-implemented method of claim 5, wherein the output is of a you only look once type.

13. The computer-implemented method of claim 5, wherein the last processing layer comprises a softmax layer.

14. The computer-implemented method of claim 5, wherein:
    the plurality of probabilities comprises an integer number of probabilities, and
    the pre-determined number of pre-determined points in the respective cell comprises integer numbers between zero and one less than the integer number of probabilities.

15. The computer system of claim 10, further comprising a camera configured to acquire the image.

* * * * *

UNITED STATES PATENT AND TRADEMARK OFFICE
CERTIFICATE OF CORRECTION

| | | |
|---|---|---|
| PATENT NO. | : 12,211,233 B2 | Page 1 of 1 |
| APPLICATION NO. | : 17/659301 | |
| DATED | : January 28, 2025 | |
| INVENTOR(S) | : Kamil Lelowicz et al. | |

It is certified that error appears in the above-identified patent and that said Letters Patent is hereby corrected as shown below:

In the Claims

Column 9, Claim 1, Line 26: after "on", delete "a"

Column 9, Claim 5, Line 47: before "The", delete "A"

Column 10, Claim 10, Line 39: after "on", delete "a"

Signed and Sealed this
Fifteenth Day of April, 2025

Coke Morgan Stewart
*Acting Director of the United States Patent and Trademark Office*